(12) United States Patent
Lu et al.

(10) Patent No.: US 12,316,381 B2
(45) Date of Patent: May 27, 2025

(54) DEVICE CONTROL METHOD, DEVICE, AND COMMUNICATION SYSTEM

(71) Applicant: Huawei Technologies Co., Ltd., Shenzhen (CN)

(72) Inventors: Qing Lu, Nanjing (CN); Changxin Yao, Nanjing (CN); Chao Gu, Nanjing (CN); Jian Xiang, Nanjing (CN); Shiyong Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 18/074,869

(22) Filed: Dec. 5, 2022

(65) Prior Publication Data

US 2023/0134181 A1 May 4, 2023

Related U.S. Application Data (63) Continuation of application No. PCT/CN2021/095203, filed on May 21, 2021.

(30) Foreign Application Priority Data

Jun. 4, 2020 (CN) .......................... 202010501317.9

(51) Int. Cl.
| | |
|---|---|
| *H04B 10/00* | (2013.01) |
| *H04B 10/2575* | (2013.01) |
| *H04B 10/564* | (2013.01) |
| *H04J 14/00* | (2006.01) |

(52) U.S. Cl.
CPC ..... *H04B 10/25759* (2013.01); *H04B 10/564* (2013.01)

(58) Field of Classification Search
CPC ..... H04B 10/80; H04B 10/806; H04B 10/808
See application file for complete search history.

(56) References Cited

U.S. PATENT DOCUMENTS

| | | | |
|---|---|---|---|
| 2005/0105913 A1 | 5/2005 | Ozeki et al. | |
| 2006/0262463 A1 | 11/2006 | Mah | |
| 2009/0028566 A1* | 1/2009 | Abbott ................. | H04B 10/038 398/104 |
| 2014/0258742 A1 | 9/2014 | Chien et al. | |
| 2021/0159941 A1* | 5/2021 | Mestezky ........ | H04B 10/25753 |

FOREIGN PATENT DOCUMENTS

| | | |
|---|---|---|
| CN | 102866761 A | 1/2013 |
| CN | 104412541 A | 3/2015 |
| CN | 204349576 U | 5/2015 |
| CN | 104810102 A | 7/2015 |
| CN | 204836199 U | 12/2015 |

(Continued)

*Primary Examiner* — Daniel G Dobson
(74) *Attorney, Agent, or Firm* — Conley Rose, P.C.

(57) ABSTRACT

A communication system includes a first device and a second device connected through an electro-optical composite cable. The electro-optical composite cable includes an optical fiber and a power supply cable. The optical fiber is used to transmit a data signal. The power supply cable is used to transmit a direct current. The first device is configured to send a first alternating-current signal to the second device through the power supply cable. The second device is configured to switch a running status based on the first alternating-current signal.

20 Claims, 4 Drawing Sheets

(56) References Cited

FOREIGN PATENT DOCUMENTS

| | | | |
|---|---|---|---|
| CN | 105656018 A | | 6/2016 |
| CN | 205408023 U | * | 7/2016 |
| CN | 109428329 A | | 3/2019 |
| CN | 109599950 A | | 4/2019 |
| EP | 2637315 A2 | | 9/2013 |
| EP | 3661193 A1 | | 6/2020 |
| JP | 2012103730 A | | 5/2012 |
| WO | 2019173094 A1 | | 9/2019 |

* cited by examiner

DEVICE CONTROL METHOD, DEVICE, AND COMMUNICATION SYSTEM

CROSS-REFERENCE TO RELATED APPLICATIONS

This application is a continuation of International Patent Application No. PCT/CN2021/095203, filed on May 21, 2021, which claims priority to Chinese Patent Application No. 202010501317.9, filed on Jun. 4, 2020. The disclosures of the aforementioned applications are hereby incorporated by reference in their entireties.

TECHNICAL FIELD

The present disclosure relates to the field of communication technologies, and in particular, to a device control method, a device, and a communication system.

BACKGROUND

A communication system usually includes a plurality of devices (such as a switch and a router) that are connected to each other, and communication data can be transmitted between devices in the communication system.

The plurality of devices in the communication system are usually connected through an electro-optical composite cable. The electro-optical composite cable includes an optical fiber and a power supply cable. The devices in the communication system may transmit, through the power supply cable, a direct current signal for power supplying, and transmit, through the optical fiber, a data signal for communication.

However, functions of the devices in a current communication system are simple.

SUMMARY

The present disclosure provides a device control method, a device, and a communication system to resolve a problem that functions of devices in a current communication system are simple. The technical solution is as follows.

According to a first aspect, a communication system is provided. The communication system includes a first device and a second device that are connected through an electro-optical composite cable, where the electro-optical composite cable includes an optical fiber and a power supply cable, the optical fiber is used to transmit a data signal, and the power supply cable is used to transmit a direct current. The first device is configured to send a first alternating-current signal to the second device through the power supply cable, and the second device is configured to switch a running status based on the first alternating-current signal. The first alternating-current signal indicates the second device to switch the running status.

It can be learned that in the communication system provided in the present disclosure, the first device may send the first alternating-current signal to the second device through the power supply cable to indicate the second device to switch the running status. Therefore, functions of the first device and the second device are enriched. In addition, a direct current is originally transmitted on the power supply cable, and the first alternating-current signal and the direct current may be superimposed on the power supply cable and transmitted to the second device. Because the first alternating-current signal is an alternating-current signal, the first alternating-current signal and the direct current do not affect each other when being simultaneously transmitted on the power supply cable, effective transmission of the first alternating-current signal and the direct current can be implemented at the same time.

Optionally, the second device is further configured to send a second alternating-current signal to the first device through the power supply cable, and the first device is further configured to generate the first alternating-current signal based on a current running status. The second alternating-current signal indicates a current running status of the second device. It can be learned that the second device can further feed back the current running status of the second device to the first device based on the second alternating-current signal. Alternatively, the second alternating-current signal and the direct current may be superimposed on the power supply cable and transmitted to the first device. In addition, because the second alternating-current signal is an alternating-current signal, the second alternating-current signal does not affect transmission of the direct current on the power supply cable, effective transmission of the second alternating-current signal and the direct current can be implemented at the same time. After receiving the second alternating-current signal, the first device may determine, based on the current running status of the second device that is indicated by the second alternating-current signal, whether to control the second device to switch the running status. When the second device needs to be controlled to switch the running status, the first device may send, to the second device through the foregoing power supply cable, the first alternating-current signal that indicates to switch the running status.

It should be noted that a basis for determining, by the first device, whether the second device needs to be controlled to switch the running status may include a current running status of the second device. Certainly, the basis may alternatively not be limited thereto. Optionally, the basis may include a case in which a power decrease condition and a power increase condition are met. When either of the power decrease condition and the power increase condition is met, the first device may determine that the second device needs to be controlled to switch the running status. The power decrease condition includes an amount of data to be sent by the first device to the second device is less than a first threshold, and/or an operating current of the second device is less than a second threshold. The power increase condition includes an amount of data to be sent by the first device to the second device is greater than or equal to the first threshold, and/or an operating current of the second device is greater than or equal to the second threshold. When the power decrease condition is met, power of the second device decreases after the second device switches the running status; or when the power increase condition is met, power of the second device increases after the second device switches the running status.

Optionally, the first device is further configured to send a third alternating-current signal to the second device through the power supply cable, and the second device is configured to generate the second alternating-current signal based on the third alternating-current signal. The third alternating-current signal is for querying for the current running status of the second device. It can be learned that, that the second device sends the second alternating-current signal to the first device may be an operation spontaneously performed by the second device, or may be an operation performed by the second device as indicated by the first device. When the second device sends the second alternating-current signal to the first device as indicated by the first device, the first device is further configured to send the third alternating-current signal to the second device through the power supply cable, where the third alternating-current signal is for querying for a current running status of the second device. The second device is configured to generate the second alternating-current signal based on the third alternating-current signal, and then transmit the second alternating-current signal to the first device through the power supply cable. Alternatively, the third alternating-current signal and the direct current may be superimposed on the power supply cable and transmitted to the second device. In addition, because the third alternating-current signal is an alternating-current signal, the third alternating-current signal does not affect transmission of the direct current on the power supply cable, effective transmission of the third alternating-current signal and the direct current can be implemented at the same time.

Optionally, the second device includes a power management circuit and a plurality of power-consuming devices. The power management circuit is connected to the power supply cable and at least some of the plurality of power-consuming devices, and the power management circuit is continuously in a power-on state before and after the second device switches a running status. The power management circuit is configured to: receive the direct current and the first alternating-current signal that are transmitted on the power supply cable, and supply power to the at least some power-consuming devices or forbid supplying power to the at least some power-consuming devices based on the first alternating-current signal, to switch the running status of the second device. It can be learned that the second device may implement switching of the running status by adjusting power supply status of the at least some power-consuming devices.

Optionally, the at least some power-consuming devices include the optical port. It should be noted that the optical port is connected to an optical fiber in the electro-optical composite cable, and is configured to receive, through the optical fiber, the data signal sent by the first device, and send, to the optical fiber, a data signal to be sent to the first device. When the at least some power-consuming devices include the optical port, if the power management circuit forbids supplying power to the optical port, an optical port of the second device cannot work, and the first device and the second device cannot transmit a data signal through an optical fiber. In this case, the first device may further transmit the direct current and the first alternating-current signal to the second device through the power supply cable. After the power management circuit in the second device receives the first alternating-current signal, if the power management circuit supplies power to the at least some power-consuming devices based on the first alternating-current signal, the optical port can start to work, and the first device and the second device can transmit a data signal through an optical fiber.

In this embodiment of the present disclosure, alternating-current signals (for example, the first alternating-current signal, the second alternating-current signal, and the third alternating-current signal) transmitted between a first device 01 and a second device 02 through the power supply cable may be analog signals or digital signals. For example, all these alternating-current signals may be signals that meet a serial physical interface standard (for example, meet serial physical interface standards such as RS-485, RS-422, and RS-232). For another example, these alternating-current signals may also be analog signals. When a plurality of types of alternating-current signals are needed, to distinguish between different alternating-current signals (for example, to distinguish the second alternating-current signal from the first alternating-current signal), waveforms of these alternating-current signals are different, for example, are respectively a square wave, a sine wave, and a pulse wave. That waveforms of the alternating-current signals are different may also be that one or more of features such as frequencies, amplitudes, and periods of the plurality of alternating-current signals are different.

Optionally, when the alternating-current signals transmitted between the first device and the second device are signals that meet a serial physical interface standard, these alternating-current signals may be related to a register in the second device.

In one aspect, the second device further includes an instruction register, where the instruction register is connected to the power management circuit, and the instruction register is continuously in a power-on state before and after the second device switches the running status. The first alternating-current signal requests to write, into the instruction register, a status switching instruction that indicates the second device to switch the running status. The power management circuit is configured to write the status switching instruction into the instruction register based on the first alternating-current signal, and execute the status switching instruction written into the instruction register, to supply power to the at least some power-consuming devices, or forbid supplying power to the at least some power-consuming devices.

In another aspect, the second device further includes a status register, where the status register is connected to the power management circuit, and the status register is continuously in a power-on state before and after the second device switches a running status. The status register is configured to store a current running status of the second device, and the third alternating-current signal requests to read the current running status stored in the status register. The power management circuit is configured to read, based on the third alternating-current signal, the current running status stored in the status register, and generate the second alternating-current signal.

Optionally, the first device includes a manager and a first level regulator that are connected. The second device includes a second level regulator, the power management circuit, and the plurality of power-consuming devices. Both the first level regulator and the second level regulator are connected to the power supply cable, the power management circuit is connected to the second level regulator and the at least some of the plurality of power-consuming devices, and the power management circuit is continuously in a power-on state before and after the second device switches a running status. The manager is configured to generate the first alternating-current signal and the third alternating-current signal. The first level regulator is configured to increase levels of the first alternating-current signal and the third alternating-current signal, and send, to the second level regulator through the power supply cable, the first alternating-current signal and the third alternating-current signal whose levels are increased. The second level regulator is configured to restore the levels of the first alternating-current signal and the third alternating-current signal, and send, to the power management circuit, the first alternating-current signal, the third alternating-current signal, and the direct current transmitted on the power supply cable. The power management circuit is configured to generate the second alternating-current signal, and supply power to the at least some power-consuming devices based on the first alternating-current signal, or forbid supplying power to the at least some power-consuming devices, to switch a running status of the second device. The second level regulator is configured to increase a level of the second alternating-current signal, and send, to the first level regulator through the power supply cable, the second alternating-current signal obtained after the level is increased. The first level regulator is configured to restore the level of the second alternating-current signal, and send the second alternating-current signal to the manager.

According to a second aspect, a communication device is provided. The communication device includes an optical port and an electrical port. The optical port is used to connect to an optical fiber in an electro-optical composite cable, the electrical port is used to connect to a power supply cable in the electro-optical composite cable. The electro-optical composite cable includes the optical fiber and the power supply cable, where the optical fiber is used to transmit a data signal, and the power supply cable is used to transmit a direct current. The communication device is configured to send a first alternating-current signal to another device through the power supply cable, where the first alternating-current signal indicates the another device to switch a running status.

Optionally, the communication device is further configured to receive a second alternating-current signal sent by the another device through the power supply cable, and generate the first alternating-current signal based on a current running status. The second alternating-current signal indicates the current running status of the another device.

Optionally, the communication device is further configured to send a third alternating-current signal to the another device through the power supply cable, where the third alternating-current signal is for querying for the current running status of the another device.

Optionally, the first alternating-current signal, the second alternating-current signal, and the third alternating-current signal are all signals that meet a serial physical interface standard.

Optionally, when alternating-current signals transmitted between the first device and the another device are signals that meet the serial physical interface standard, these alternating-current signals may be related to a register in the another device.

In one aspect, the another device further includes an instruction register, where the instruction register is connected to a power management circuit, and the instruction register is continuously in a power-on state before and after the another device switches the running status. The first alternating-current signal requests to write, into the instruction register, a status switching instruction that indicates the another device to switch the running status.

In another aspect, the another device further includes a status register, where the status register is connected to the power management circuit, and the status register is continuously in a power-on state before and after the another device switches a running status. The status register is configured to store a current running status of the another device. The third alternating-current signal requests to read the current running status stored in the status register.

Optionally, waveforms of the first alternating-current signal, the second alternating-current signal, and the third alternating-current signal are different from each other.

Optionally, the communication device includes a manager and a first level regulator that are connected to each other, where the first level regulator is connected to the power supply cable, and the manager is configured to generate the first alternating-current signal and the third alternating-current signal. The first level regulator is configured to increase levels of the first alternating-current signal and the third alternating-current signal, and send, to the another device through the power supply cable, the first alternating-current signal and the third alternating-current signal whose levels are increased. The first level regulator is further configured to: receive, through the power supply cable, the second alternating-current signal obtained after the level is increased, restore the level of the second alternating-current signal, and send the second alternating-current signal to the manager.

Optionally, when a power decrease condition is met, power of the another device decreases after the another device switches a running status; or when a power increase condition is met, power of the another device increases after the another device switches a running status. The power decrease condition includes an amount of data to be sent by the first device to the another device is less than a first threshold, and/or an operating current of the another device is less than a second threshold. The power increase condition includes an amount of data to be sent by the first device to the another device is greater than or equal to the first threshold, and/or an operating current of the another device is greater than or equal to the second threshold.

According to a third aspect, a communication device is provided. The communication device includes an optical port and an electrical port, where the optical port is used to connect to an optical fiber in an electro-optical composite cable, and the electrical port is used to connect to a power supply cable in the electro-optical composite cable. The electro-optical composite cable includes the optical fiber and the power supply cable, where the optical fiber is used to transmit a data signal, and the power supply cable is used to transmit a direct current. The communication device is configured to receive, through the power supply cable, a first alternating-current signal sent by another device and switch a running status in response to receiving the first alternating-current signal.

Optionally, the communication device is further configured to send a second alternating-current signal to the another device through the power supply cable, where the second alternating-current signal indicates a current running status of the communication device.

Optionally, the communication device is further configured to receive a third alternating-current signal sent by the another device through the power supply cable, and generate the second alternating-current signal based on the third alternating-current signal. The third alternating-current signal is for querying for the current running status of the communication device.

Optionally, the communication device includes a power management circuit and a plurality of power-consuming devices. The power management circuit is connected to the power supply cable and at least some of the plurality of power-consuming devices; and the power management circuit is continuously in a power-on state before and after the communication device switches a running status. The power management circuit is configured to receive the direct current and the first alternating-current signal that are transmitted on the power supply cable, and supply power to the at least some power-consuming devices or forbid supplying power to the at least some power-consuming devices based on the first alternating-current signal to switch the running status of the communication device.

Optionally, the at least some power-consuming devices include the optical port.

Optionally, the first alternating-current signal, the second alternating-current signal, and the third alternating-current signal are all signals that meet a serial physical interface standard.

Optionally, when alternating-current signals transmitted between the another device and the communication device are signals that meet the serial physical interface standard, these alternating-current signals may be related to a register in the communication device.

In one aspect, the communication device further includes an instruction register, where the instruction register is connected to the power management circuit, and the instruction register is continuously in a power-on state before and after the communication device switches the running status. The first alternating-current signal requests to write, into the instruction register, a status switching instruction that indicates the communication device to switch the running status. The power management circuit is configured to write the status switching instruction into the instruction register based on the first alternating-current signal, and execute the status switching instruction written into the instruction register, to supply power to the at least some power-consuming devices, or forbid supplying power to the at least some power-consuming devices.

In another aspect, the communication device further includes a status register, where the status register is connected to the power management circuit, and the status register is continuously in a power-on state before and after the communication device switches a running status. The status register is configured to store a current running status of the communication device. The third alternating-current signal requests to read the current running status stored in the status register. The power management circuit is configured to read, based on the third alternating-current signal, the running status stored in the status register, and generate the second alternating-current signal.

Optionally, waveforms of the first alternating-current signal, the second alternating-current signal, and the third alternating-current signal are different from each other.

Optionally, the communication device includes a second level regulator, a power management circuit, and a plurality of power-consuming devices. The second level regulator is all connected to the power supply cable, the power management circuit is connected to the second level regulator and at least some of the plurality of power-consuming devices, and the power management circuit is continuously in a power-on state before and after the communication device switches a running status. The second level regulator is configured to restore levels of the first alternating-current signal and the third alternating-current signal, and send the first alternating-current signal, the third alternating-current signal, and the direct current transmitted on the power supply cable to the power management circuit. The power management circuit is configured to generate the second alternating-current signal, and supply power to the at least some power-consuming devices based on the first alternating-current signal, or forbid supplying power to the at least some power-consuming devices, to switch a running status of the communication device. The second level regulator is configured to: increase a level of the second alternating-current signal, and send, to the first level regulator through the power supply cable, the second alternating-current signal whose level is increased.

Optionally, when a power decrease condition is met, power of the communication device decreases after the communication device switches the running status; or when a power increase condition is met, power of the communication device increases after the communication device switches the running status. The power decrease condition includes an amount of data to be sent by the another device to the communication device is less than a first threshold, and/or an operating current of the communication device is less than a second threshold. The power increase condition includes an amount of data to be sent by the another device to the communication device is greater than or equal to the first threshold, and/or an operating current of the communication device is greater than or equal to the second threshold.

According to a fourth aspect, a device control method is provided. The method includes sending a first alternating-current signal to another device by using a power supply cable in an electro-optical composite cable, where the first alternating-current signal indicates the another device to switch a running status; and the electro-optical composite cable further includes an optical fiber, the optical fiber is configured to transmit a data signal, and the power supply cable is configured to transmit a direct current.

Optionally, the method further includes receiving a second alternating-current signal sent by the another device through the power supply cable, and generating the first alternating-current signal based on a current running status. The second alternating-current signal indicates the current running status of the another device.

Optionally, the method further includes sending a third alternating-current signal to the another device through the power supply cable, where the third alternating-current signal is for querying for the current running status of the another device.

Optionally, the first alternating-current signal, the second alternating-current signal, and the third alternating-current signal are all signals that meet a serial physical interface standard.

Optionally, the method is used for a communication device. When alternating-current signals transmitted between the communication device and the another device are signals that meet the serial physical interface standard, these alternating-current signals may be related to a register in the another device.

In one aspect, the another device further includes an instruction register, where the instruction register is connected to a power management circuit, and the instruction register is continuously in a power-on state before and after the another device switches the running status. The first alternating-current signal requests to write, into the instruction register, a status switching instruction that indicates the another device to switch the running status.

In another aspect, the another device further includes a status register, where the status register is connected to the power management circuit, and the status register is continuously in a power-on state before and after the another device switches a running status. The status register is configured to store the current running status of the another device. The third alternating-current signal requests to read the current running status stored in the status register.

Optionally, waveforms of the first alternating-current signal, the second alternating-current signal, and the third alternating-current signal are different from each other.

Optionally, the communication device includes a manager and a first level regulator that are connected to each other, where the first level regulator is connected to the power supply cable, and the manager is configured to generate the first alternating-current signal and the third alternating-current signal. The first level regulator is configured to increase levels of the first alternating-current signal and the third alternating-current signal, and send, to the another device through the power supply cable, the first alternating-current signal and the third alternating-current signal whose levels are increased. The first level regulator is further configured to: receive, through the power supply cable, the second alternating-current signal obtained after the level is increased, restore the level of the second alternating-current signal, and send the second alternating-current signal to the manager.

Optionally, when a power decrease condition is met, power of the another device decreases after the another device switches the running status; or when a power increase condition is met, power of the another device increases after the another device switches the running status. The power decrease condition includes an amount of data to be sent by the communication device to the another device is less than a first threshold, and/or an operating current of the another device is less than a second threshold. The power increase condition includes an amount of data to be sent by the communication device to the another device is greater than or equal to the first threshold, and/or an operating current of the another device is greater than or equal to the second threshold.

According to a fifth aspect, a device control method is provided. The method includes receiving a first alternating-current signal sent by another device through a power supply cable in an electro-optical composite cable; switching a running status in response to receiving the first alternating-current signal. The electro-optical composite cable further includes an optical fiber, where the optical fiber is used to transmit a data signal, and the power supply cable is used to transmit a direct current.

Optionally, the method is used for the communication device, and the method further includes sending a second alternating-current signal to the another device through the power supply cable, where the second alternating-current signal indicates a current running status of the communication device.

Optionally, the method further includes receiving a third alternating-current signal sent by the another device through the power supply cable, and generates the second alternating-current signal based on the third alternating-current signal. The third alternating-current signal is for querying for the current running status of the communication device.

Optionally, the communication device includes a power management circuit and a plurality of power-consuming devices. The power management circuit is connected to the power supply cable and at least some of the plurality of power-consuming devices; and the power management circuit is continuously in a power-on state before and after the communication device switches a running status. The power management circuit is configured to: receive the direct current and the first alternating-current signal that are transmitted on the power supply cable, and supply power to the at least some power-consuming devices or forbid supplying power to the at least some power-consuming devices based on the first alternating-current signal, to switch the running status of the communication device.

Optionally, the at least some power-consuming devices include the optical port.

Optionally, the first alternating-current signal, the second alternating-current signal, and the third alternating-current signal are all signals that meet a serial physical interface standard.

Optionally, when alternating-current signals transmitted between the another device and the communication device are signals that meet the serial physical interface standard, these alternating-current signals may be related to a register in the communication device.

In one aspect, the communication device further includes an instruction register, where the instruction register is connected to the power management circuit, and the instruction register is continuously in a power-on state before and after the communication device switches the running status. The first alternating-current signal requests to write, into the instruction register, a status switching instruction that indicates the communication device to switch the running status. The power management circuit is configured to write the status switching instruction into the instruction register based on the first alternating-current signal, and execute the status switching instruction written into the instruction register, to supply power to the at least some power-consuming devices, or forbid supplying power to the at least some power-consuming devices.

In another aspect, the communication device further includes a status register, where the status register is connected to the power management circuit, and the status register is continuously in a power-on state before and after the communication device switches a running status. The status register is configured to store a current running status of the communication device. The third alternating-current signal requests to read the current running status stored in the status register. The power management circuit is configured to read, based on the third alternating-current signal, the current running status stored in the status register, and generate the second alternating-current signal.

Optionally, waveforms of the first alternating-current signal, the second alternating-current signal, and the third alternating-current signal are different from each other.

Optionally, the communication device includes a second level regulator, the power management circuit, and a plurality of power-consuming devices. The second level regulator is all connected to the power supply cable, the power management circuit is connected to the second level regulator and at least some of the plurality of power-consuming devices, and the power management circuit is continuously in a power-on state before and after the communication device switches a running status. The second level regulator is configured to restore levels of the first alternating-current signal and the third alternating-current signal, and send the first alternating-current signal, the third alternating-current signal, and the direct current transmitted on the power supply cable to the power management circuit. The power management circuit is configured to generate the second alternating-current signal, and supply power to the at least some power-consuming devices based on the first alternating-current signal, or forbid supplying power to the at least some power-consuming devices, to switch a running status of the communication device. The second level regulator is configured to: increase a level of the second alternating-current signal, and send, to the first level regulator through the power supply cable, the second alternating-current signal whose level is increased.

Optionally, when a power decrease condition is met, power of the communication device decreases after the communication device switches a running status; or when a power increase condition is met, power of the communication device increases after the communication device switches a running status. The power decrease condition includes an amount of data to be sent by the another device to the communication device is less than a first threshold, and/or an operating current of the communication device is less than a second threshold. The power increase condition includes an amount of data to be sent by the another device to the communication device is greater than or equal to the first threshold, and/or an operating current of the communication device is greater than or equal to the second threshold.

For beneficial effects of the second aspect to the fifth aspect, refer to beneficial effects in corresponding descriptions of the first aspect.

DESCRIPTION OF EMBODIMENTS

To make principles and technical solutions of the present disclosure clearer, the following further describes implementations of the present disclosure in detail with reference to the accompanying drawings.

Figure 1:
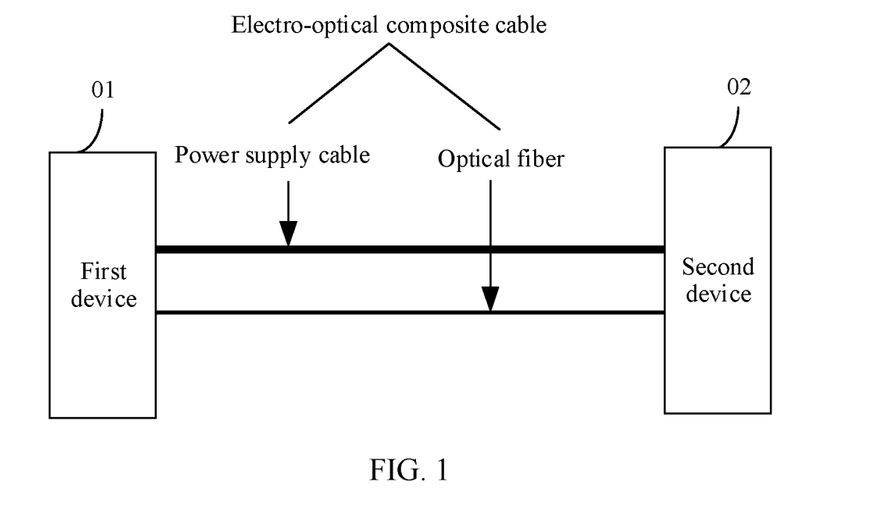
FIG. 1 is a schematic diagram illustrating a structure of a communication system according to an embodiment of the present disclosure.

An embodiment of the present disclosure provides a communication system. As shown in FIG. 1, the communication system includes a first device 01 and a second device 02 that are connected through an electro-optical composite cable.

The first device 01 and the second device 02 may be any communication device, such as a switch or a router. The first device 01 and the second device 02 may be communication devices of different types, or may be communication devices of a same type. This is not limited in this embodiment of the present disclosure.

Refer to FIG. 1. The electro-optical composite cable that connects the first device 01 and the second device 02 includes an optical fiber and a power supply cable, where two ends of each of the optical fiber and the power supply cable are respectively connected to the first device 01 and the second device 02. The power supply cable may be any cable that can supply power, for example, a copper cable (with two or more copper wires), a twisted pair (including a shielded twisted pair or an unshielded twisted pair), or the like. The power supply cable may include two paths (not shown in FIG. 1), which are respectively a first path and a loop of the first path. A voltage difference between the first path and the loop of the first path may be any voltage difference, for example, 48 volts. In FIG. 1, an example in which the optical fiber and the power supply cable are separated from each other is used. Optionally, the optical fiber and the power supply cable may alternatively be bound together to form an entire cable. This is not limited in this embodiment of the present disclosure. An electro-optical composite cable can transmit a signal at a high rate over a long transmission distance. For example, the electro-optical composite cable can support a signal transmission distance of more than 200 meters. A transmission rate of a data signal that can be supported by the electro-optical composite cable is greater than 10 Gbps (Gbps represents 1000 megabits per second). For example, the transmission rate of the data signal can reach 25 Gbps or 100 Gbps.

In the communication system, an optical fiber is used to transmit a data signal, and a data signal may be transmitted between the first device 01 and the second device 02 through the optical fiber, to implement communication between the first device 01 and the second device 02. The power supply cable is used to transmit a direct current, and the first device 01 may transmit the direct current to the second device 02 through the power supply cable, to supply power to the second device 02. In this case, the first device 01 is used as power sourcing equipment (PSE), the second device 02 is used as powered device (PD), and both the power sourcing equipment and the powered device transmit a data signal and a direct current through the electro-optical composite cable.

However, functions of devices (for example, the first device 01 and the second device 02) in a current communication system are still simple. Based on this, in this embodiment of the present disclosure, new functions are assigned to the first device 01 and the second device 02, and this enriches functions of devices in the communication system.

For example, in this embodiment of the present disclosure, the first device 01 is configured to send a first alternating-current signal to the second device 02 through a power supply cable, where the first alternating-current signal indicates the second device 02 to switch a running status; and the second device 02 is configured to switch the running status based on the first alternating-current signal. It should be noted that a direct current is originally transmitted on the power supply cable, and the first alternating-current signal and the direct current may be superimposed on the power supply cable and transmitted to the second device 02. In addition, because the first alternating-current signal is an alternating-current signal, the first alternating-current signal and the direct current do not affect each other when being simultaneously transmitted on the power supply cable, effective transmission of the first alternating-current signal and the direct current can be implemented at the same time.

In conclusion, in the communication system provided in this embodiment of the present disclosure, the first device may send the first alternating-current signal to the second device through the power supply cable, to indicate the second device to switch the running status. Therefore, functions of the first device and the second device are enriched.

Figure 2:
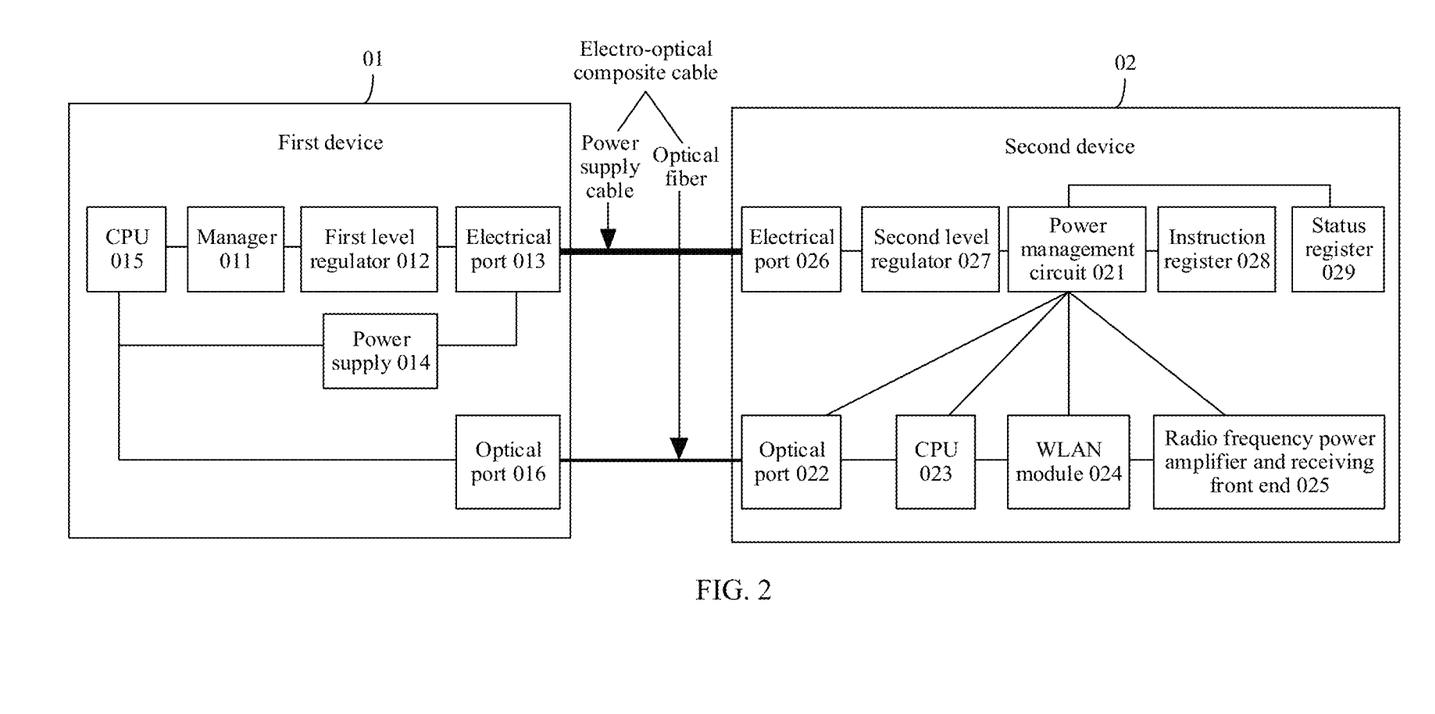
FIG. 2 is a schematic diagram illustrating a structure of another communication system according to an embodiment of the present disclosure.

For example, FIG. 2 is a schematic diagram of a structure of another communication system according to an embodiment of the present disclosure. As shown in FIG. 2, a second device 02 includes a power management circuit 021 and a plurality of power-consuming devices. The plurality of power-consuming devices may include an optical port 022, a central processing unit (CPU) 023, a wireless local area network (WLAN) module group 024, and a radio frequency power amplifier and receiving front end 025 in FIG. 2.

Refer to FIG. 2. The power management circuit 021 is connected to a power supply cable in an electro-optical composite cable. For example, the second device 02 may further include an electrical port 026, and the power management circuit 021 may be connected to the power supply cable through the electrical port 026. The power management circuit 021 is further connected to at least some of the plurality of power-consuming devices. As shown in FIG. 2, the at least some power-consuming devices may include the optical port 022, the CPU 023, the WLAN module 024, and the radio frequency power amplifier and receiving front end 025.

The power management circuit 021 may be continuously in a power-on state before and after the second device 02 switches a running status. The power management circuit

021 is configured to: receive a direct current and a first alternating-current signal that are transmitted on the power supply cable, and supply power, based on the first alternating-current signal, to the at least some power-consuming devices connected to the power management circuit 021 or forbid supplying power to the at least some power-consuming devices, to switch the running status of the second device 02. It can be learned that the second device 02 may implement switching of the running status by adjusting a power supply status of the at least some power-consuming devices.

It should be noted that, in this embodiment of the present disclosure, an example in which the at least some power-consuming devices include the optical port 022, the CPU 023, the WLAN module 024, and the radio frequency power amplifier and receiving front end 025 is used. Certainly, the at least some power-consuming devices may also be different from these power-consuming devices. For example, the at least some power-consuming devices may include only some power-consuming devices of the optical port 022, the CPU 023, the WLAN module 024, and the radio frequency power amplifier and receiving front end 025. This is not limited in this embodiment of the present disclosure. It should be noted that the optical port 022 is connected to an optical fiber in the electro-optical composite cable, and is configured to receive, through the optical fiber, a data signal sent by the first device 01, and send, to the optical fiber, a data signal to be sent to the first device 01. When the at least some power-consuming devices include the optical port 022, if the power management circuit 021 forbids supplying power to the optical port 022, the optical port 022 of the second device 02 cannot work, and the first device 01 and the second device 02 cannot transmit a data signal through an optical fiber. In this case, the first device 01 may further transmit the direct current and the first alternating-current signal to the second device 02 through the power supply cable. After the power management circuit 021 in the second device 02 receives the first alternating-current signal, if the power management circuit 021 supplies power to the at least some power-consuming devices based on the first alternating-current signal, the optical port 022 can start to work, and the first device 01 and the second device 02 can transmit a data signal through the optical fiber.

Optionally, before the power management circuit 021 forbids supplying power to the CPU 023 of the second device 02, the power management circuit 021 may first send a sleep instruction to the CPU 023, so that the CPU 023 can store some running data in advance before being forbidden from supplying power. After the power management circuit 021 supplies power to the CPU 023 of the second device 02, the power management circuit 021 may send a wake-up instruction to the CPU 023, so that the CPU 023 can immediately read some previously stored running data after being powered on, so that the CPU 023 runs normally after being powered on.

Optionally, the power management circuit 021 may be further divided, based on functions thereof, into a first circuit and a second circuit (not shown in FIG. 2) that are connected in series, where both the first circuit and the second circuit are connected to the power supply cable through the electrical port 026, and the second circuit is connected to the at least some foregoing power-consuming devices. The first circuit is configured to receive a first alternating-current signal transmitted on the power supply cable, and the second circuit is configured to receive a direct current transmitted on the power supply cable. The first circuit is further configured to control, based on the first alternating-current signal, the second circuit to supply power to the at least some power-consuming devices connected to the second circuit or forbid supplying power to the at least some power-consuming devices, to switch the running status of the second device. If the power management circuit 021 may be further divided into the first circuit and the second circuit, the first circuit may alternatively be connected to a CPU in the second device, and both the wake-up instruction and the sleep instruction may be sent by the first circuit to the CPU.

Further, still refer to FIG. 2. The optical port 022, the CPU 023, the WLAN module 024, and the radio frequency power amplifier and receiving front end 025 may be sequentially connected in series. The CPU 023 of the second device 02 is configured to: process a signal sent by an external device, and generate a signal that needs to be sent to the external device.

For example, the external device may include the first device 01. A data signal that needs to be sent by the first device 01 to the second device 02 may be sequentially transmitted to the CPU 023 of the second device 02 through the optical fiber and the optical port 022. The CPU 023 of the second device 02 may sequentially transmit, to the first device through the optical port 022 and the optical fiber, the data signal that needs to be sent to the first device 01. The optical port 022 is configured to convert, from an optical signal into an electrical signal, a data signal that is from the optical fiber, and transmit the data signal converted into the electrical signal to the CPU 023. The optical port 022 is further configured to convert, from an electrical signal into an optical signal, a data signal that is from the CPU 023, and transmit the data signal converted into the electrical signal to the optical fiber.

For another example, the external device may further include another device (not shown in the accompanying drawings of the specification) other than the first device 01. A signal that needs to be sent by the CPU 023 of the second device 02 to the another device may be transmitted to the another device sequentially through the WLAN module 024 and the radio frequency power amplifier and receiving front end 025. The another device may alternatively transmit, to the CPU 023 of the second device 02 sequentially through the radio frequency power amplifier and receiving front end 025 and the WLAN module 024, a signal that needs to be sent to the second device 02. The WLAN module 024 is configured to convert the signal from the CPU 023 into a radio signal that conforms to a WLAN protocol. The radio frequency power amplifier and receiving front end 025 is configured to convert the radio signal from the WLAN module 024 into an antenna signal that is easy to transmit through an antenna. The radio frequency power amplifier and receiving front end 025 is further configured to receive, through the antenna, an antenna signal sent by the another device, convert the antenna signal into a radio signal that conforms to the WLAN protocol, and transmit the radio signal to the WLAN module 024. The WLAN module 024 is further configured to convert the radio signal from the radio frequency power amplifier and receiving front end 025 into a signal that can be identified by the CPU 023, and send the signal to the CPU 023.

It should be noted that, in FIG. 2, an example in which the plurality of power-consuming devices in the second device 02 include the optical port 022, the CPU 023, the WLAN module 024, and the radio frequency power amplifier and receiving front end 025 is used. Certainly, the plurality of power-consuming devices may not be limited to these devices, and a structure of the second device 02 is not limited to the structure shown in FIG. 2. This is not limited in this embodiment of the present disclosure.

In the foregoing embodiment, the second device 02 may switch a running status based on the first alternating-current signal sent by the first device 01. Optionally, the second device 02 may be further configured to send a second alternating-current signal to the first device 01 through the foregoing power supply cable, where the second alternating-current signal indicates a current running status of the second device 02. It can be learned that the second device 02 can further feed back the current running status of the second device to the first device based on the second alternating-current signal. Alternatively, the second alternating-current signal and the direct current may be superimposed on the power supply cable and transmitted to the first device 01. In addition, because the second alternating-current signal is an alternating-current signal, the second alternating-current signal does not affect transmission of the direct current on the power supply cable. Therefore, effective transmission of the second alternating-current signal and the direct current can be implemented at the same time.

When the second device 02 can feed back the current running status to the first device 01 based on the second alternating-current signal, the first device 01 is further configured to generate the first alternating-current signal based on the current running status of the second device 02. For example, after receiving the second alternating-current signal, the first device 01 may determine, based on the current running status of the second device 02 that is indicated by the second alternating-current signal, whether the second device 02 needs to be controlled to switch the running status. When the second device 02 needs to be controlled to switch the running status, the first device 01 may send, to the second device 02 through the foregoing power supply cable, the first alternating-current signal that indicates to switch the running status.

It should be noted that a basis for determining, by the first device 01, whether the second device 02 needs to be controlled to switch the running status may include the current running status of the second device 02. Certainly, the basis may alternatively not be limited thereto. For example, the basis may include a case in which a power decrease condition and a power increase condition are met. When either of the power decrease condition and the power increase condition is met, the first device 01 may determine that the second device 02 needs to be controlled to switch the running status. The power decrease condition includes an amount of data to be sent by the first device 01 to the second device 02 is less than a first threshold, and/or an operating current of the second device 02 is less than a second threshold. The power increase condition includes an amount of data to be sent by the first device 01 to the second device 02 is greater than or equal to the first threshold, and/or an operating current of the second device 02 is greater than or equal to the second threshold. When the power decrease condition is met, power of the second device 02 decreases after the second device 02 switches the running status based on the first alternating-current signal. When the power increase condition is met, power of the second device 02 increases after the second device 02 switches the running status based on the first alternating-current signal. Optionally, an amount of data to be sent by the first device 01 to the second device 02 may be reflected by a capacity of a first input first output (First Input First Output, FIFO) container in the first device 01. When the capacity of the FIFO container in the first device 01 is less than a capacity threshold, it indicates that the amount of the data to be sent by the first device 01 to the second device 02 is less than the first threshold.

In this embodiment of the present disclosure, the first device can control the second device to switch between a plurality of (at least two) running statuses, and in the plurality of running statuses, power of the second device is different, and power consumption of the second device is different. For example, when there is no data service between the first device 01 and the second device 02 (for example, the amount of the data to be sent by the first device 01 to the second device 02 is less than the first threshold, and an uplink service of the second device 02 is in an idle state), the first device may control the second device to forbid supplying power to an optical port, to reduce power consumption of the second device 02. When there is no data service between the first device and the second device, and a downlink service of the second device 02 is also in an idle state, the first device may control the second device to forbid supplying power to the CPU, the WLAN module, and the radio frequency power amplifier and receiving front end, to further reduce power consumption of the second device. When there is a data service between the first device and the second device, the first device may control the second device to supply power to the optical port and the CPU. When the downlink service of the second device is running, the first device may control the second device to supply power to the CPU, the WLAN module, and the radio frequency power amplifier and receiving front end. It should be noted that, when the first device determines that power consumption of the second device needs to be reduced currently, if a current running status of the second device is a running status with lowest power consumption in a plurality of running statuses of the second device, the first device may not need to control the second device to switch the running status.

Optionally, that the second device 02 sends the second alternating-current signal to the first device 01 may be an operation spontaneously performed by the second device 02, or may be an operation performed by the second device 02 as indicated by the first device 01. When the second device 02 sends the second alternating-current signal to the first device 01 as indicated by the first device 01, the first device 01 is further configured to send a third alternating-current signal to the second device 02 through the power supply cable, where the third alternating-current signal is for querying for the current running status of the second device 02. The second device 02 is configured to generate the second alternating-current signal based on the third alternating-current signal, and then transmit the second alternating-current signal to the first device 01 through the power supply cable. Alternatively, the third alternating-current signal and the direct current may be superimposed on the power supply cable and transmitted to the second device 02. In addition, because the third alternating-current signal is an alternating-current signal, the third alternating-current signal does not affect transmission of the direct current on the power supply cable. Therefore, effective transmission of the third alternating-current signal and the direct current can be implemented at the same time.

Optionally, the first device 01 may send the third alternating-current signal to the second device 02 for a plurality of times (for example, periodically send the third alternating-current signal to the second device 02). The second device 02 may feed back the second alternating-current signal to the first device 01 each time after receiving the third alternating-current signal. The first device 01 may determine, based on the second alternating-current signal fed back by the second device 02 at least once recently, whether the second device 02 needs to be controlled to switch the running status.

The following describes a process in which the first device 01 and the second device 02 send alternating-current signals (for example, the first alternating-current signal, the second alternating-current signal, and the third alternating-current signal) to each other.

Still refer to FIG. 2. The first device 01 includes a manager 011 and a first level regulator 012 that are connected, and the second device 02 further includes a second level regulator 027. Both the first level regulator 012 and the second level regulator 027 are connected to the power supply cable, and the second level regulator 027 is connected to the power management circuit 021 in the second device 02. For example, the first device 01 may further include an electrical port 013. The first level regulator 012 is connected to the power supply cable by using the electrical port 013 of the first device 01. The second level regulator 027 is connected in series to a path between an electrical port 026 and the power management circuit 021. The second level regulator 027 is connected to the power supply cable by using the electrical port 026 of the second device 02.

The manager 011 in the first device 01 is configured to: generate alternating-current signals (for example, the first alternating-current signal and the third alternating-current signal) that need to be sent to the second device, and send the generated alternating-current signals (for example, the first alternating-current signal and the third alternating-current signal) to the first level regulator 012. The first level regulator 012 is configured to: increase a level of the alternating-current signal generated by the manager 011, and send, to the second level regulator 027 of the second device 02 through the power supply cable, the alternating-current signal whose level is increased.

The second level regulator 027 in the second device 02 is configured to restore levels of alternating-current signals (for example, the first alternating-current signal and the third alternating-current signal) from the first device (for example, decrease the level of the alternating-current signal to a state before a level increase), and send, to the power management circuit 021, the alternating-current signal whose level is restored. The second level regulator 027 is further configured to send, to the power management circuit 021, the direct current transmitted on the power supply cable. The power management circuit 021 is not only configured to supply power to the at least some power-consuming devices or forbid supplying power to the at least some power-consuming devices based on the received first alternating-current signal, to switch the running status of the second device, but also may be configured to generate the second alternating-current signal (for example, generate the second alternating-current signal based on the received third alternating-current signal). The power management circuit 021 is further configured to send the generated second alternating-current signal to the second level regulator 027. The second level regulator 027 is configured to increase a level of the second alternating-current signal generated by the power management circuit 021, and send, to the first level regulator 012 of the first device 01 through the power supply cable (for example, sequentially through the electrical port 026, the power supply cable, and the electrical port 013), the second alternating-current signal obtained after the level increase. The first level regulator 012 in the first device 01 is configured to restore the level of the second alternating-current signal (for example, decrease the level of the second alternating-current signal to a state before a level increase), and send, to the manager 011, the second alternating-current signal whose level is restored.

Still refer to FIG. 2. The first device 01 may further include a power supply 014. The power supply 014 is connected to the power supply cable by using the electrical port 013. The power supply 014 is configured to transmit, to the power supply cable by using the electrical port 013, a direct current for supplying power to the second device 02. The first device 01 may further include a CPU 015 and an optical port 016. The CPU 015 is connected to the power supply 014, the manager 011, and the optical port 016, and the optical port 016 is connected to an optical fiber. Similar to the CPU 023 in the second device 02, the CPU 015 in the first device 01 may also be configured to: process a signal sent by an external device, and generate a signal that needs to be sent to the external device. Details are not described herein in this embodiment of the present disclosure.

It should be noted that, in this embodiment of the present disclosure, an example in which the manager 011 and the CPU 015 in the first device 01 are independent of each other and the power management circuit 021 and the CPU 023 in the second device 02 are independent of each other is used. Optionally, the manager 011 may alternatively be at least partially integrated into the CPU 015, and the power management circuit 021 may alternatively be at least partially integrated into the CPU 023. This is not limited in this embodiment of the present disclosure. Optionally, when the power management circuit 021 is integrated into the CPU 023, before and after the second device 02 switches the running status, a module that is in the CPU 023 and that is configured to implement a function of the power management circuit 021 may be continuously in a power-on state, and a module other than the module in the CPU 023 may be in a power-on state or a power-off state.

In this embodiment of the present disclosure, alternating-current signals (for example, the first alternating-current signal, the second alternating-current signal, and the third alternating-current signal) transmitted between the first device 01 and the second device 02 through the power supply cable may be analog signals or digital signals. For example, all these alternating-current signals may be signals that meet a serial physical interface standard (for example, meet the serial physical interface standard such as RS-485, RS-422, or RS-232). For another example, these alternating-current signals may alternatively be analog signals. When a plurality of types of alternating-current signals are needed, to distinguish between different alternating-current signals (for example, to distinguish the second alternating-current signal from the first alternating-current signal), waveforms of these alternating-current signals are different, for example, are respectively a square wave, a sine wave, and a pulse wave. That waveforms of the alternating-current signals are different may also be that one or more of features such as frequencies, amplitudes, and periods of the plurality of alternating-current signals are different.

Optionally, when alternating-current signals transmitted between the first device 01 and the second device 02 through the power supply cable are signals that meet the serial physical interface standard, the first alternating-current signal not only indicates the second device 02 to switch a running status, but also may indicate a target running status to which the second device 02 needs to switch. In this case, the first alternating-current signal needs to carry information about the target running status.

Optionally, when the alternating-current signals transmitted between the first device 01 and the second device 02 are signals that meet the serial physical interface standard, these alternating-current signals may be related to a register in the second device 02.

In one aspect, as shown in FIG. 2, the register in the second device 02 may include an instruction register 028. The instruction register 028 is connected to the power management circuit 021, and the instruction register 028 is continuously in a power-on state before and after the second device switches the running status. The first alternating-current signal sent by the first device 01 to the second device 02 may request to write a status switching instruction into the instruction register 028, and the status switching instruction indicates the second device to switch the running status. Optionally, the status switching instruction may further indicate the target running status to which the second device 02 needs to switch. The power management circuit 021 is configured to write the status switching instruction into the instruction register based on the first alternating-current signal, and execute the status switching instruction written into the instruction register 028, to supply power to or forbid supplying power to the at least some power-consuming devices, to switch the running status of the second device 02.

For example, the instruction register 028 may include a plurality of groups of device bits that are in a one-to-one correspondence with the plurality of power-consuming devices in the second device, where each group of device bits is used to store control instructions of a corresponding power-consuming device, and the control instructions include a power supply instruction and a power supply forbiddance instruction. The power management circuit 021 may, according to a control instruction stored in each device bit, supply power to or forbid supplying power to a power-consuming device corresponding to the device bit. For example, when a control instruction in a device bit is the power supply instruction, the power management circuit 021 may supply, according to the power supply instruction, power to a power-consuming device corresponding to the device bit. When a control instruction in a device bit is the power supply forbiddance instruction, the power management circuit 021 may forbid, according to the power supply forbiddance instruction, supplying power to a power-consuming device corresponding to the device bit.

As shown in Table 1, the instruction register 028 may include eight device bits (Bit 0 to Bit 7) in total. It is assumed that the plurality of power-consuming devices in the second device include a power amplifier, a radio frequency transceiver, and a physical layer chip (which are, in this example, different from the power-consuming devices in the second device shown in FIG. 2). In this case, a plurality of groups of device bits in the eight device bits include a first group of device bits corresponding to the power amplifier (including a 1$^{st}$ device bit Bit 0 in the eight device bits), and a second group of device bits corresponding to the radio frequency transceiver (including a 2$^{nd}$ device bit Bit 1 in the eight device bits), and a third group of device bits corresponding to a physical layer chip (including a 3$^{rd}$ device bit Bit 2 in the eight device bits). The eight device bits may further include device bits Bit 3 to Bit 7 in addition to the plurality of groups of device bits, and these device bits may be reserved bits. Each device bit may record a control instruction of a corresponding power-consuming device based on a status value. For example, in Table 1, when a status value of a device bit is 1, the device bit is used to record a power supply instruction of a corresponding power-consuming device; when a status value of a device bit is 0, the device bit is used to record a power supply forbiddance instruction of a corresponding power-consuming device. Optionally, the status value may be a binary, an octal, or a hexadecimal value, and a default status value of each device bit may be 0 or 1. This is not limited in this embodiment of the present disclosure.

TABLE 1

| Device bit | Status value | Power-consuming device | Control instruction |
|---|---|---|---|
| Bit 0 | 1 | Power amplifier | Power supply instruction |
|  | 0 |  | Power supply forbiddance instruction |
| Bit 1 | 1 | Radio frequency transceiver | Power supply instruction |
|  | 0 |  | Power supply forbiddance instruction |
| Bit 2 | 1 | Physical layer chip | Power supply instruction |
|  | 0 |  | Power supply forbiddance instruction |

In another aspect, as shown in FIG. 2, the register in the second device 02 may further include a status register 029. The status register 029 is connected to the power management circuit 021, and the status register 029 is continuously in a power-on state before and after the second device switches the running status. The status register 029 is configured to store the current running status of the second device. The foregoing third alternating-current signal sent by the first device 01 may request to read the current running status stored in the status register 029. The power management circuit 021 may be configured to read, based on the third alternating-current signal, the current running status stored in the status register 029, and generate the second alternating-current signal based on the current running status.

As shown in Table 2, the status register 029 may include eight status bits (Bit 0 to Bit 7) in total. The eight status bits may include at least one group of status bits in a one-to-one correspondence with at least one running parameter of the second device. Each group of status bits is used to record a value of a corresponding running parameter, and a value of the at least one running parameter is used to reflect the current running status of the second device. As shown in Table 2, the plurality of groups of status bits include a first group of status bits (including a 1$^{st}$ status bit Bit 0 to a 3$^{rd}$ status bit Bit 3 in the eight status bits) corresponding to a running mode, and a second group of status bits (including a 4$^{th}$ status bit Bit 4 in the eight status bits) corresponding to a downlink service status, and a third group of status bits corresponding to an uplink service status (including a 5$^{th}$ status bit Bit 5 in the eight status bits). The eight status bits may further include status bits Bit 6 and Bit 7 in addition to the plurality of groups of status bits, and these status bits may be reserved bits. Each status bit may record a value of a corresponding running parameter based on a status value. For example, in Table 2, when a status value of the first group of status bits Bit 0 to Bit 3 is 0000, the first group of status bits is used to record that the running mode of the second device is a mode 1, and when a status value of the second group of status bits Bit 4 is 0, the second group of status bits is used to record that a downlink service status of the second device is running. Optionally, the status value may be a binary, an octal, or a hexadecimal value, and a default status value of each status bit may be 0 or 1. This is not limited in this embodiment of the present disclosure.

TABLE 2

| Status Bit | Status value | Running parameter | Value of a running parameter |
|---|---|---|---|
| Bit 0 to Bit 3 | 0000 | Running mode | Mode 1 |
| | 0001 | | Mode 2 |
| | 0010 | | Mode 3 |
| | 0011 | | Mode 4 |
| | 0100 | | Mode 5 |
| Bit 4 | 1 | Downlink service status | Running |
| | 0 | | Idle |
| Bit 5 | 1 | Uplink service status | Running |
| | 0 | | Idle |

It should be noted that, in this embodiment of the present disclosure, an example in which both the instruction register 028 and the status register 029 are located outside the power management circuit 021 is used. Optionally, both the instruction register 028 and the status register 029 may be integrated into the power management circuit 021. In this embodiment of the present disclosure, implementations of the instruction register 028 and the status register 029 are described by using the examples shown in Table 1 and Table 2 as examples. Optionally, the implementations of the instruction register 028 and the status register 029 may alternatively be different from the examples shown in Table 1 and Table 2. This is not limited in this embodiment of the present disclosure.

It can be learned from the foregoing embodiment that the first device is used as power sourcing equipment, the second device is used as powered device, and the first device can control the second device to switch the running status, to adjust power of the second device, to adjust power consumption of the second device. In a process of switching the running status of the second device, the power management circuit in the second device may supply power to or forbid supplying power to at least some power-consuming devices, where the at least some power-consuming devices may include an uplink device and/or a downlink device. The uplink device is configured to transmit or process an uplink signal, and the uplink signal is a signal that the second device needs to transmit to the first device. The downlink device is configured to transmit or process a downlink signal, and the downlink signal is a signal that the second device needs to transmit to a device other than the first device. When the at least power-consuming devices include both the uplink device and the downlink device, the power management circuit forbids supplying power to the at least some power-consuming devices, so that power consumption of the second device can be greatly reduced. In addition, in this embodiment of the present disclosure, the second device can be forbidden from supplying power to the entire CPU in a process of switching the running status, so that the power consumption of the second device does not include power consumption of running the CPU, and the power consumption of the second device is further reduced.

In a related technology, the powered device can control a downlink device of the powered device by itself to be turned on or off, to adjust a running status of the powered device and change power consumption of the powered device. However, regardless of whether the downlink device of the powered device is turned on or off, the uplink device in the powered device is in an on state. Consequently, power consumption of the powered device is still high. In addition, the CPU in the powered device always needs to maintain an on state. As a result, the power consumption of the powered device includes at least the power consumption of running the CPU. It can be learned that an amount by which the power consumption of the powered device can be reduced in this embodiment of the present disclosure is far greater than an amount by which power consumption of powered device can be reduced in a related technology.

Figure 3:
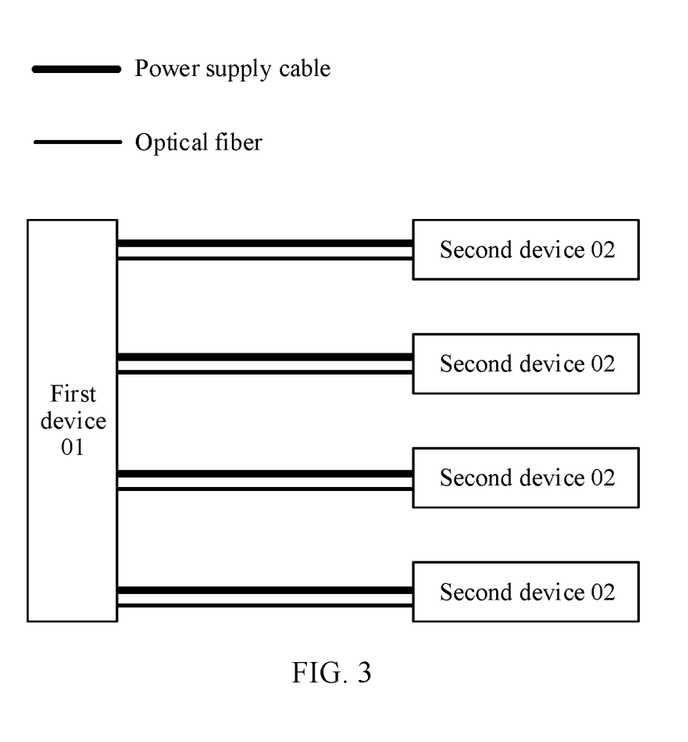
FIG. 3 is a schematic diagram illustrating a structure of still another communication system according to an embodiment of the present disclosure.

It should be noted that, in this embodiment of the present disclosure, an example in which the communication system includes one first device and one second device connected to the first device is used. A quantity of first devices in the communication system may be not limited to one, and a quantity of second devices connected to each first device is also not limited to one. When the first device is connected to a plurality of second devices, as shown in FIG. 3, the first device 01 is connected to each second device 02 through an electro-optical composite cable (including a power supply cable and an optical fiber), an optical fiber connected to each second device 02 is connected to an optical port (not shown in FIG. 3) of the first device 01, and a power supply cable connected to each second device 02 is connected to an electrical port (not shown in FIG. 3) of the first device 01. Before sending an alternating-current signal (for example, the first alternating-current signal or the third alternating-current signal), the first device 01 may first send a notification signal to all second devices 02 connected to the first device 01. The notification signal indicates a second device 02 to which the to-be-sent alternating-current signal is to be sent (for example, the notification signal carries an address of the second device 02). After receiving the notification signal, the second device 02 may send a response signal to the first device 01, so that the first device 01 sends the alternating-current signal to the outside based on the response signal. In this case, although each second device 02 can receive the alternating-current signal, only the second device 02 that sends the response signal identifies and responds to the alternating-current signal.

Based on the communication system provided in embodiments of the present disclosure, an embodiment of the present disclosure provides a device control method.

Figure 4:
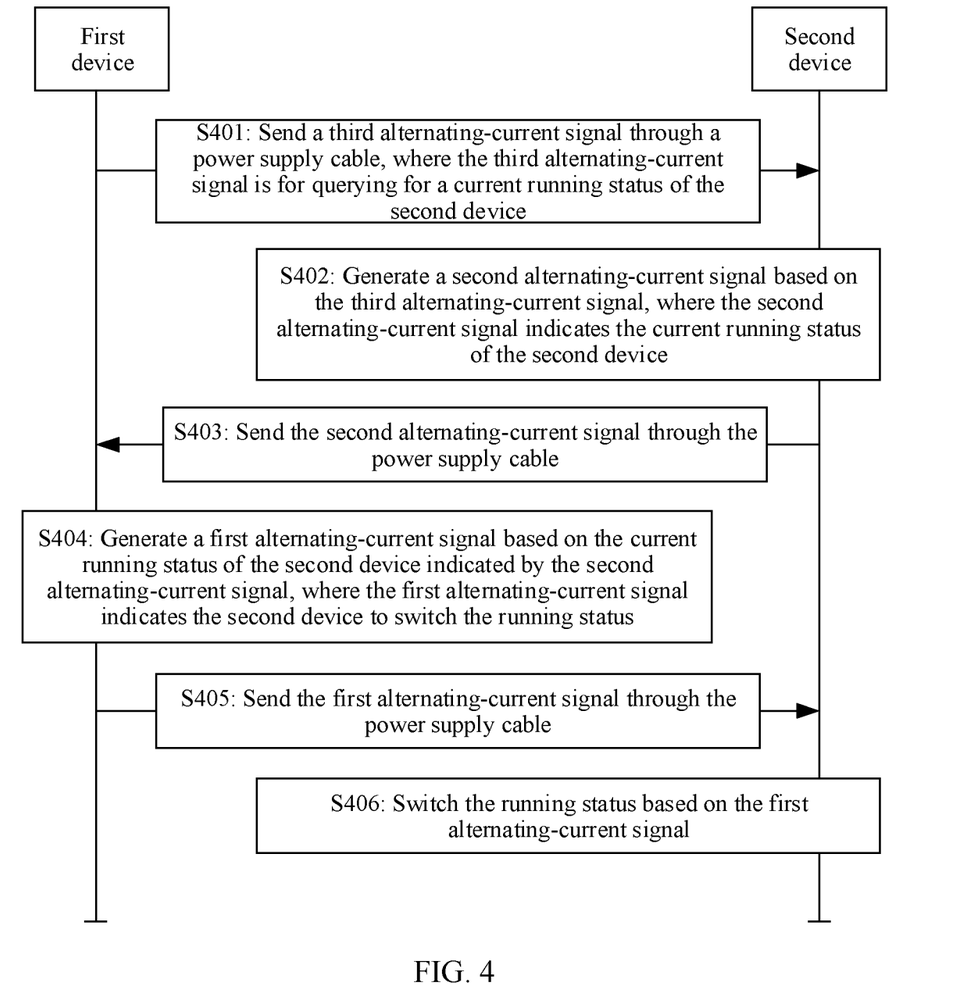
FIG. 4 is a flowchart illustrating a device control method according to an embodiment of the present disclosure.

For example, FIG. 4 is a flowchart of a device control method according to an embodiment of the present disclosure. The method may be used for the communication system provided in this embodiment of the present disclosure. As shown in FIG. 4, the device control method may include the following steps.

S401: A first device sends a third alternating-current signal to a second device through a power supply cable, where the third alternating-current signal is for querying for a current running status of the second device.

The first device may send the third alternating-current signal to the second device for one or more times through the power supply cable, to query for the current running status of the second device for one or more times. For explanations of the third alternating-current signal, refer to related content in the communication system embodiments. Details are not described herein again in this embodiment of the present disclosure.

S402: The second device generates a second alternating-current signal based on the third alternating-current signal, where the second alternating-current signal indicates the current running status of the second device.

Each time after receiving the third alternating-current signal sent by the first device, the second device may generate, based on the third alternating-current signal, the second alternating-current signal that indicates the current running status of the second device. For explanations of the second alternating-current signal, refer to related content in the communication system embodiments. Details are not described herein again in this embodiment of the present disclosure.

S403: The second device sends the second alternating-current signal to the first device through the power supply cable.

Each time after generating the second alternating-current signal, the second device may send the second alternating-current signal to the first device through the power supply cable. When the first device sends the third alternating-current signal to the second device for a plurality of times in S401, the second device generates the second alternating-current signal for a plurality of times in S402, and sends the second alternating-current signal to the first device for a plurality of times in S403.

S404: The first device generates a first alternating-current signal based on the current running status of the second device indicated by the second alternating-current signal, where the first alternating-current signal indicates the second device to switch the running status.

The first device may determine, based on the current running status indicated by the second alternating-current signal sent by the second device for one or more times, whether the second device needs to be controlled to switch the running status, for example, determine whether the second device needs to be controlled to switch the current running status to a running status with lower power consumption or higher power consumption. When determining that the first device needs to be controlled to switch the running status, the first device may generate the first alternating-current signal that indicates the second device to switch the running status. For a process in which the first device determines whether the second device needs to be controlled to switch the running status and explanations of the first alternating-current signal, refer to related content in the foregoing communication system embodiments. Details are not described herein again in this embodiment of the present disclosure.

S405: The first device sends the first alternating-current signal to the second device through the power supply cable.

After generating the first alternating-current signal, the first device may send the first alternating-current signal to the second device through the power supply cable, to indicate the second device to switch the running status.

S406: The second device switches the running status based on the first alternating-current signal.

After receiving the first alternating-current signal that indicates to switch the running status, the second device may switch the running status based on the first alternating-current signal. For a process of how the second device switches the running status based on the first alternating-current signal, refer to related content in the foregoing communication system embodiments. Details are not described herein again in this embodiment of the present disclosure.

It should be noted that the third alternating-current signal sent by the first device to the second device in S401, the second alternating-current signal sent by the second device to the first device in S403, and the first alternating-current signal sent by the first device to the second device in S405 may all be transmitted through the power supply cable in the electro-optical composite cable. In addition, because these alternating-current signals and the direct current transmitted on the power supply cable do not interfere with each other, effective transmission of these alternating-current signals and the direct current can be implemented at the same time.

In conclusion, the device control method provided in this embodiment of the present disclosure, the first device may send the first alternating-current signal to the second device through the power supply cable, to indicate the second device to switch the running status. Therefore, functions of the first device and the second device are enriched.

A sequence of operations in the method embodiment provided in this embodiment of the present disclosure can be properly adjusted, and operations can also be correspondingly added or deleted based on a situation. For example, S401 and S402 may not be performed, or S403 and S404 may not be performed. Any variation method readily figured out by a person skilled in the art within the technical scope disclosed in the present disclosure shall fall within the protection scope of the present disclosure. Therefore, details are not described herein.

It should be noted that in the present disclosure, "at least one" means one or more, and "a plurality of" means two or more. In this disclosure, the terms "first", "second", and the like are merely intended for description, and shall not be understood as an indication or implication of relative importance. The term "and/or" in the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. Mutual reference can be made between the method embodiments provided in embodiments of the present disclosure and corresponding communication system embodiments. This is not limited in embodiments of the present disclosure.

In the embodiments provided in the present disclosure, it should be understood that the disclosed device may be implemented in other manners. For example, the described device structures are merely examples. For example, division into the device structures is merely logical function division and may be other division in actual implementation. The structures described as separate parts may not be physically separate, and some or all of the structures may be selected depending on an actual requirement to achieve the objectives of the solutions of the embodiments.

What is claimed is:

1. A communication device comprising:
an optical port connected to an optical fiber of an electro-optical composite cable, the optical fiber configured to transmit a data signal; and
an electrical port configured to connect to a power supply cable of the electro-optical composite cable, the power supply cable configured to transmit a direct current,
wherein the communication device is configured to send a first alternating-current signal to a second device through the power supply cable, and wherein the first alternating-current signal indicates to the second device to switch a running status.

2. The communication device of claim 1, wherein the communication device is further configured to:
receive, through the power supply cable, a second alternating-current signal from the second device, wherein the second alternating-current signal indicates a current running status of the second device; and
generate the first alternating-current signal based on the current running status.

3. The communication device of claim 2, wherein the communication device is further configured to send a third alternating-current signal to the second device through the power supply cable, and wherein the third alternating-current signal enables querying for the current running status of the second device.

4. The communication device of claim 3, wherein the first alternating-current signal, the second alternating-current signal, and the third alternating-current signal comply with a serial physical interface standard.

5. The communication device of claim 3, wherein waveforms of the first alternating-current signal, the second alternating-current signal, and the third alternating-current signal are different from each other.

6. A communication device comprising:
an optical port connected to an optical fiber of an electro-optical composite cable, the optical fiber configured to transmit a data signal; and
an electrical port configured to connect to a power supply cable of the electro-optical composite cable, the power supply cable configured to transmit a direct current, and wherein the communication device is configured to:
receive, through the power supply cable, a first alternating-current signal from a first device; and
switch a running status in response to receiving the first alternating-current signal.

7. The communication device of claim 6, further configured to send a second alternating-current signal to the first device through the power supply cable, and wherein the second alternating-current signal indicates a current running status of the communication device.

8. The communication device of claim 7, further configured to receive, through the power supply cable, a third alternating-current signal from the first device, wherein the third alternating-current signal enables querying for the current running status of the communication device.

9. The communication device of claim 8, further configured to generate the second alternating-current signal based on the third alternating-current signal.

10. The communication device of claim 8, wherein the first alternating-current signal, the second alternating-current signal, and the third alternating-current signal comply with a serial physical interface standard.

11. The communication device of claim 8, wherein waveforms of the first alternating-current signal, the second alternating-current signal, and the third alternating-current signal are different from each other.

12. The communication device of claim 8, further comprising:
a plurality of power-consuming devices; and
a power management circuit configured to:
connect to the power supply cable and at least a part of the plurality of power-consuming devices;
continuously run in a power-on state before and after the communication device switches the running status;
the direct current and the first alternating-current signal transmitted on the power supply cable; and
supply power to at least the part of power-consuming devices or forbid supplying power to at least the part of power-consuming devices based on the first alternating-current signal to switch the running status of the communication device.

13. The communication device of claim 12, wherein the at least the part of power-consuming devices comprises the optical port.

14. A device control method implemented by a first device, the device control method comprising:
sending a first alternating-current signal to a second device through a power supply cable of an electro-optical composite cable, the power supply cable configured to transmit a direct current and wherein the first alternating-current signal indicates to the second device to switch a running status.

15. The device control method of claim 14, further comprising transmitting a data signal over an optical fiber of the electro-optical composite cable.

16. The device control method of claim 15, further comprising receiving, through the power supply cable, a second alternating-current signal from the second device, wherein the second alternating-current signal indicates a current running status of the second device.

17. The device control method of claim 16, further comprising generating the first alternating-current signal based on the current running status.

18. The device control method of claim 17, further comprising sending a third alternating-current signal to the second device through the power supply cable, and wherein the third alternating-current signal enables querying for the current running status of the second device.

19. The device control method of claim 18, wherein the first alternating-current signal, the second alternating-current signal, and the third alternating-current signal comply with a serial physical interface standard.

20. The device control method of claim 19, wherein waveforms of the first alternating-current signal, the second alternating-current signal, and the third alternating-current signal are different from each other.

* * * * *